United States Patent [19]

Tsuyuguchi et al.

[11] Patent Number: 5,425,014

[45] Date of Patent: Jun. 13, 1995

[54] APPARATUS FOR CONSTANT ANGULAR VELOCITY READING OF CONSTANT LINEAR VELOCITY DISKS

[75] Inventors: Hiroshi Tsuyuguchi, Tokyo; Sho Sugiyama, Iruma; Shinichi Fujisawa, Fussa, all of Japan

[73] Assignee: Teac Corporation, Tokyo, Japan

[21] Appl. No.: 228,957

[22] Filed: Apr. 18, 1994

Related U.S. Application Data

[63] Continuation of Ser. No. 919,716, Jul. 24, 1992, abandoned.

[30] Foreign Application Priority Data

Jul. 25, 1991 [JP] Japan .................. 3-208675

[51] Int. Cl.$^6$ .............................. G11B 7/00
[52] U.S. Cl. ........................ 369/48; 369/54; 369/124
[58] Field of Search ................ 369/47–50, 369/53, 54, 58, 124

[56] References Cited

U.S. PATENT DOCUMENTS 4,893,294  1/1990  Kimura et al. ............ 369/50 X
4,959,825  9/1990  Okano ...................... 369/48
5,134,500  7/1992  Tobe ........................ 369/48 X
5,200,944  4/1993  Souma ..................... 369/50 X
5,243,587  9/1993  Itoh et al. ................. 369/48

*Primary Examiner*—W. R. Young
*Attorney, Agent, or Firm*—Woodcock Washburn Kurtz Mackiewicz & Norris

[57] ABSTRACT

An apparatus for reading at a constant angular velocity a CD-ROM or like optical disk that is designed to be driven at a constant linear velocity, thereby combining the higher storage capacity of CLV with the shorter access time of CAV. The CLV disk has clock data prerecorded all along its multiturn spiral track together with primary information to be retrieved and utilized by the user. As an optoelectric transducer traces the track, a first clock derives from the clock data a first clock signal which varies in frequency in step with the varying rate of the clock data being read on the CLV disk being driven at CAV. The recovered primary information is written on a memory being docked by the first clock signal and read out therefrom while the memory is being clocked by a second clock signal having a constant frequency, so that the information has a constant transfer rate on being read out from the memory. The information may be demodulated before or after being made constant in transfer rate.

4 Claims, 3 Drawing Sheets

APPARATUS FOR CONSTANT ANGULAR VELOCITY READING OF CONSTANT LINEAR VELOCITY DISKS

This is a continuation of application Ser. No. 07/919,716, filed Jul. 24, 1992, now abandoned.

BACKGROUND OF THE INVENTION

This invention relates to an apparatus for reading digital data storage disks that are designed to rotate at a constant linear velocity (CLV). Examples of such CLV disks are optical disks typically including the read-only data storage disk known as CD-ROM and the consumer "compact audio" disk.

Digital information is usually recorded on CD-ROM and compact audio disk in the eight to fourteen modulation (EFM) encoding format, as disclosed for example in U.S. Pat. No. 4,893,294 to Kimura et al. Such optical disks are also notable for the CLV method of reading; that is, the rotation rate of the disk is varied according to the radius of the track accessed so that a constant data rate corresponds to a constant bit density along the track. This allows an increase in capacity as compared with constant angular velocity (CAV) used for magnetic disks and some optical disks.

The higher data density of CLV has been offset, however, by the longer access time required. In accessing any track position on a CLV disk, the rotation rate of the disk has had to be varied according to the radial position of the optical pickup or transducer. The longer access time can be ascribed to the required variation of the rotation rate. A shorter access time is possible if the disk rotates at a steady speed, as in CAV.

Another objection to the prior art CLV concerns the hardware of the CLV disk drive. The electronics for varying the rotation rate according to the radius of the track accessed is very complex and expensive, adding substantially to the cost of the disk drive.

The applicants are aware of modified constant linear velocity (MCLV) and modified constant angular velocity (MCAV) heretofore suggested for disk drives. In MCLV the data tracks on an optical disk are grouped in a number of bands; the same angular velocity is used while accessing all the tracks within a band, but a different velocity is used for each band. In MCAV, on the other hand, the tracks are usually grouped into four to eight bands; the clock rate and data rate are varied between bands, but not within a band, while the rotation rate of the disk is constant.

Thus both MCLV and MCAV are a compromise between CLV and CAV. They represent no truly satisfactory solution to the problem of how to combine the advantages of CLV and CAV and to thoroughly defeat their disadvantages.

SUMMARY OF THE INVENTION

The present invention seeks to combine the high data density of CLV with the short access time of CAV in a manner capable of deriving full benefits therefrom and defeating their shortcomings and, in so doing, to employ simple, inexpensive and thoroughly practicable circuitry.

Briefly, the invention may be summarized as an apparatus for reading a rotating CLV disk such as CD-ROM, the CLV disk having primary information prerecorded together with clock data all along a track thereon. The apparatus comprises drive means for driving the CLV disk at CAV, and a transducer movable along the track on the rotating CLV disk for reading the prerecorded primary information and clock data. Connected to the transducer, a first clock produces a first clock signal derived from the clock data read on the CLV disk, the first clock signal varying in frequency in step with a varying rate of the clock data being read on the CLV disk being driven at CAV. A second clock produces a second clock signal having a constant frequency. Also included is a memory which is connected to the transducer and to the first and the second clocks for storing the recovered primary information while being clocked by the first clock signal and for putting out the recovered primary information while being clocked by the second clock signal.

Thus, although the CLV disk is read at CAV throughout the length of the track thereon, the information retrieved therefrom is made constant in transfer rate by being temporarily written on the memory and read out therefrom. The retrieved information may be demodulated either before or after being made constant in transfer rate. If the information is to be retrieved before being written on the memory, as in a preferred embodiment to be disclosed subsequently then the demodulator circuit may be clocked by the first clock signal.

The above and other features and advantages of this invention and the manner of realizing them will become more apparent, and the invention itself will best be understood, from a study of the following description and appended claims, with reference had to the attached drawings showing and the preferred embodiment of the invention.

DESCRIPTION OF THE PREFERRED EMBODIMENT

Figure 2:
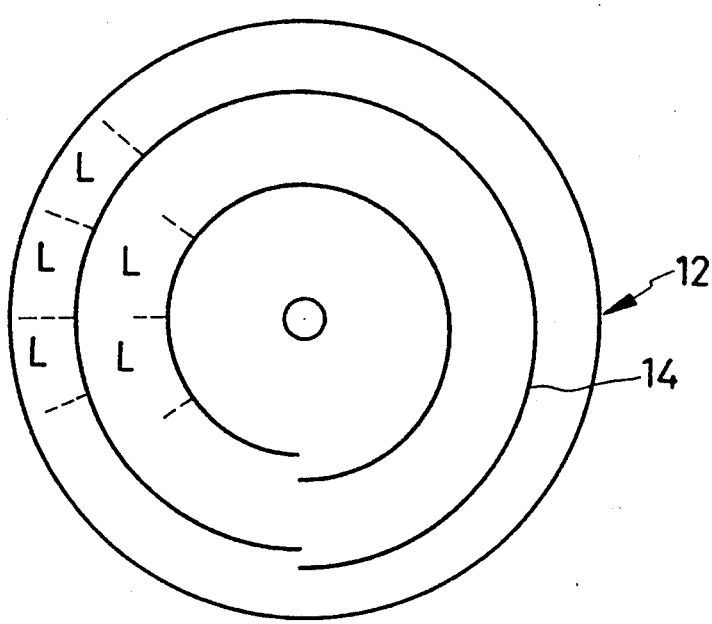
FIG. 2 is a schematic illustration of a CD-ROM disk for use with a the disk drive of FIG. 1.

The invention will now be described in detail as embodied in the CD-ROM disk drive diagramed in FIG. I and therein generally designated 10. This figure shows a replaceable read-only optical disk or CD-ROM 12 mounted in position therein. As illustrated schematically in FIG. 2, the disk 12 can be a conventional CLV disk having a multiturn spiral track 14 on a major surface thereof. Digital EFM encoded data is so prerecorded on the CLV disk 12 that the circumferential length L of each bit and each frame is the same in all the radial positions of the disk. Such digital data include clock data, aside from primary data to be retrieved and utilized by the user, for synchronization purposes. The clock data exists all along the spiral track 14 on the disk.

Both the data rate and the clock rate will be constant if the CLV disk 12 is driven CLV but vary continuously if, as in the present invention, it is driven CAV. The invention makes it possible to read the CLV disk at a constant data rate even through it is driven CAV.

Figure 3:
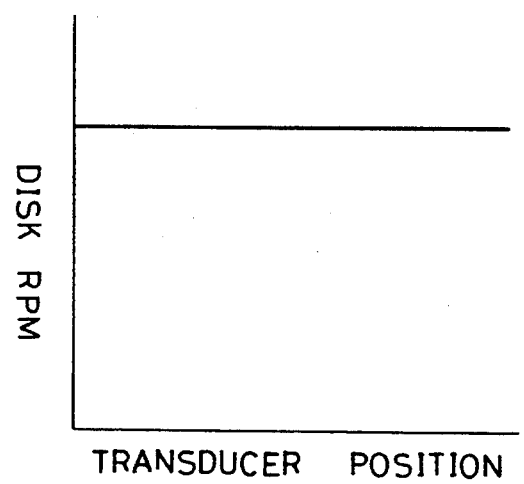
FIG. 3 is a graph showing the CAV driving of the CLV CD-ROM is disk in the disk drive of FIG. 1.

With reference back to FIG. 1 the disk 12 is rotated directly by a disk drive motor 16. A motor driver circuit 18 drives the disk drive motor 16 at a steady speed. Unlike the practice heretofore, and according to the novel concepts of the invention, the rotation rate of the CLV disk 12 is constant regardless of the radius of the track turn being accessed, as graphically indicated in FIG. 3. A known closed loop servo-mechanism, not shown, may be employed for such steady speed rotation of the disk drive motor 16.

Employed for reading the disk 12 is an optoelectric transducer 20 of conventional design comprising a laser, lens system, optical sensor, etc. The transducer 20 irradiates the disk 12 with a laser beam and translates the incident beam reflection into an electric signal representative of the prerecorded primary information and clock data. A positioning mechanism 22 coupled to the transducer 20 can also be of conventional make comprising an electric motor and a motion translating mechanism for linearly transporting the transducer across the track turns on the disk 12.

The transducer 20 has its output connected to a preamplifier 24 and thence to a wave shaping circuit 26. Having a comparator, not shown, the wave shaping circuit 26 reshapes the recovered primary information and clock data into rectangular pulses. The pulse output from the wave shaping circuit 26 is directed into an EFM demodulator circuit 28 on the one hand and, on the other hand, into a first or variable frequency clock shown enclosed in a dashed outline and generally designated 30.

Essentially, the first clock 30 is a variable frequency oscillator for generating a clock signal that varies continuously in frequency in step with the rate of the clock data being recovered from the successive turns of the track 14 on the disk 12. The first clock comprises an edge detector circuit 32, a phase comparator 34, a low pass filter (LPF) 36 and a voltage controlled oscillator (VCO) 38. Connected directly to the wave shaping circuit 26, the edge detector circuit 32 puts out pulses of very short durations (shorter in time than each bit of the prerecorded information) corresponding to the edges of the rectangular waveform. In practice the edge detector circuit 32 may be comprised of a monostable multivibrator and a differentiator circuit for triggering the same.

The phase comparator 34, LPF 36 and VCO 38 of the first clock 30 constitute in combination a phase locked loop circuit 40. The phase comparator 34 has an input connected to the edge detector circuit 32 and another input to the VCO 38. The output of the phase comparator 34 is connected to the LPF 36 and thence to the control input 42 of the VCO 38. This VCO puts out a clock signal which represents the recovered clock data and which therefore continuously varies in frequency with the progress of data recovery from each turn, and the successive turns, of the track 14 on the disk 12. The details of the VCO 38 will be subsequently set forth with reference to FIG. 4.

Figure 1:
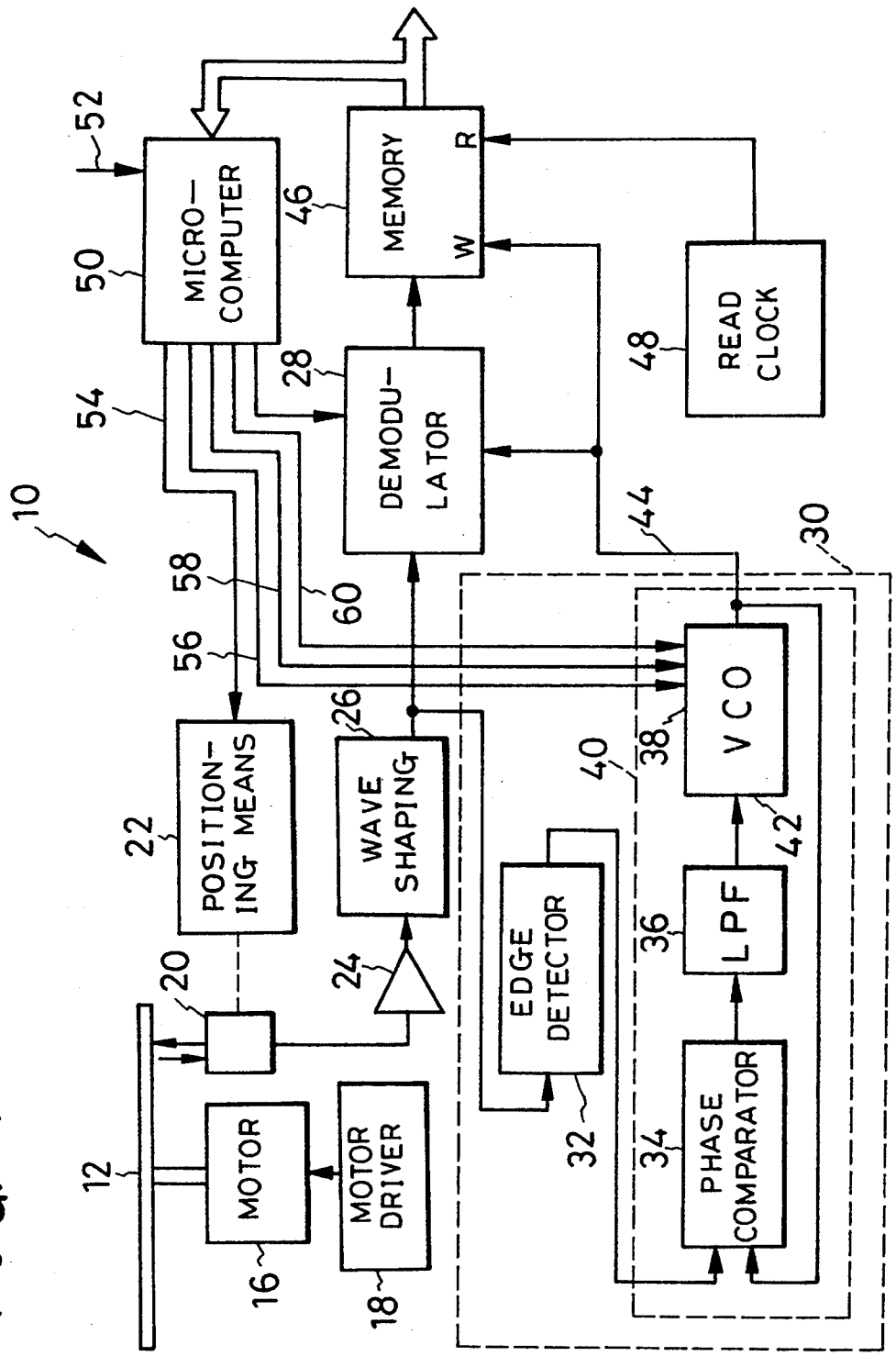
FIG. 1 is a block diagram of a CD-ROM disk drive constructed in accordance with the novel concepts of this invention.

As shown also in FIG. 1, the output line 44 of the first clock 30 is connected both to the demodulator circuit 28 and to the write clock input W of a memory 46. The demodulator circuit 28 can be of familiar construction, such as that used in compact audio disk players, capable of demodulating the recovered EFM signal into a non-return to zero (NRZ) or like signal in step with the continuously varying frequency clock signal from the clock generator circuit 30.

The memory 46, which can be a commercially available random access memory, functions to translate the continuously varying transfer rate of the NRZ signal from the demodulator circuit 28 into a constant one. Thus a second or constant frequency clock 48, which, unlike the first clock 30, generates a constant frequency clock signal, is connected to the read clock input R of the memory 46. Notwithstanding the showing of FIG. 1 the memory 46 could be connected on the preceding stage of the demodulator circuit 28.

A microcomputer 50, to which the memory 46 is connected,, functions to detect the standard address data included in the output from the memory 46, the address data being prerecorded on the disk 12 to uniquely identify the respective frames. Comparing the retrieved address data with a seek command supplied from a host system, not shown, over a line 52, the microcomputer 50 delivers over a seek control signal to the positioning means 22 over a line 54 thereby causing the positioning means to position the transducer 20 in the desired location on the disk 12.

Additionally, the microcomputer 50 determines whether the transducer 20 is located on a radially inward, intermediate or outward region of the disk 12, on the basis of either the detected address data or the seek command from the unshown host. Signals indicative of such approximate transducer positions on the disk 12 are sent over lines 56, 58 and 60 to the VCO 38 of the first or write clock 30.

It is to be understood that the showing of FIG. 1 is highly dias grammarie; the actual CD-ROM drive has many more means for its proper operation. Examples include a beam focus servo for adjustably varying the position of the objective lens included in the transducer 20, and a tracking control for adjustably varying the angle of a mirror, also included in the transducer 20, in order to correspondingly vary the beam position radially of the disk 12.

Figure 4:
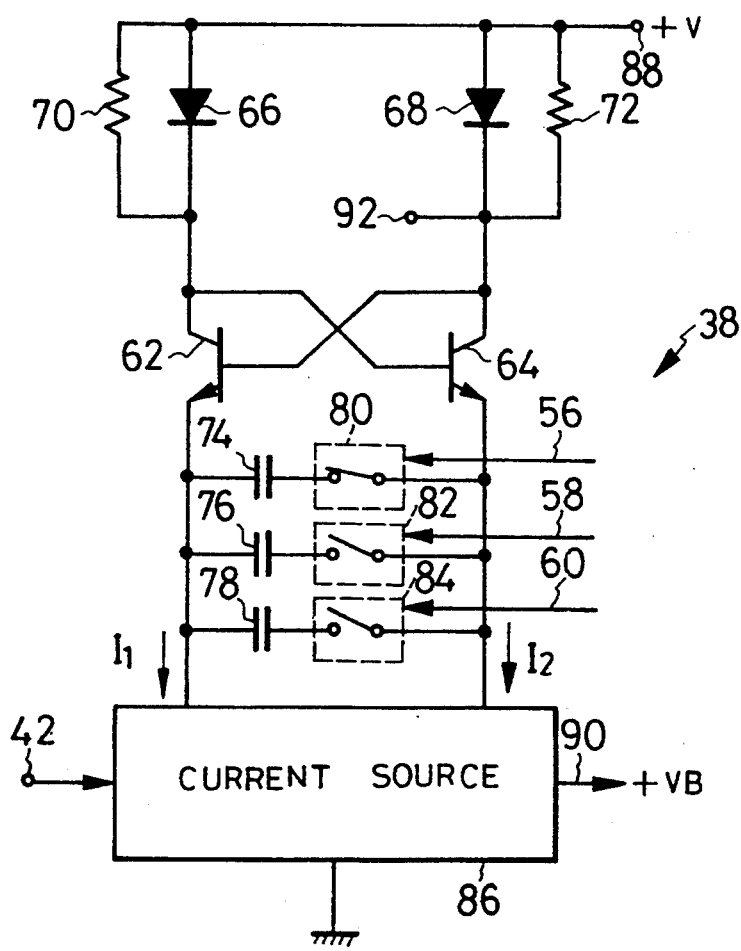
FIG. 4 is a schematic electrical diagram showing in more detail the voltage controlled oscillator included in the disk drive of FIG. 1.

Reference is now directed to FIG. 4 for a more detailed study of a the VCO 38 of the first clock 30. The VCO 38 is herein shown as a type of multivibrator comprising a pair of transistors 62 and 64, a pair of diodes 66 and 68, a pair of resistors 70 and 72, three capacilators 74, 76 and 78, three capacitor select switches 80, 82 and 84, and a control current source 86.

More specifically, the pair of transistors 62 and 64 have their collectors connected to a supply terminal 88 via the pair of resistors 70 and 72, respectively. The base of each transistor 62 or 64 is connected to the collector of the other transistor. The three capacitors 74–78 are to be selectively connected between the emitters of the transistors 52 and 64 as the three switches 80–84 are selectively closed by the signals supplied from the microcomputer 50, FIG. 1, over the lines 56–60. Each capacitor has a different capacitance. The central frequency of oscillation of the VCO 38 is therefore variable by selectively connecting the capacitors 74–78 between the emitters of the transistors 52 and 64. A biasing terminal 90 is connected to the control current source 86.

It will be seen that the control current source 86 inputs the control signal from the LPF 36, FIG. 1, of the first clock 30. The currents $I_1$ and $I_2$ due to the control current source 85 vary in magnitude with the voltage of the input control signal, resulting in changes in the frequency of the clock signal produced from an output terminal 92.

Figure 5:
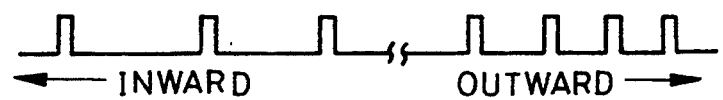
FIG. 5 is a waveform diagram of the variable frequency clock signal produced by the voltage controlled oscillator of FIG. 4.

FIG. 5 shows the clock signal produced as above by the first clock 30. The frequency of the clock signal becomes progressively higher as in the radially outward direction of the disk 12 as the rate of the clock data on the disk 12 becomes progressively higher in that direction when the CLV disk is driven at CAV.

OPERATION

For reading all the turns of the spiral track 14 on the disk 12, the transducer 20 may be positioned on the radially inmost track turn, and the disk drive motor 16 may be set into rotation at a constant speed. The unshown tracking control will first conventionally operate to cause the light beam to scan the successive track turns. The positioning means 22 will also conventionally operate to move the transducer 20 radially outwardly of the disk 12 when the beam becomes incapable of following the track solely by the tracking control.

Since the CLV disk 12 is driven at CAV according to the invention, both the data rate and the clock rate will change as the transducer scans each turn, and successive radially outer turns, of the track 14. It is nevertheless possible to demodulate the recovered information from EFM into NRZ form by the demodulator circuit 28 as this circuit is clocked by the first clock 30 at a rate varying in proportion to the varying data rate and clock rate.

The transfer rate of the demodulated information from the demodulator circuit 28 is still varying continuously with the progress of information retrieval from each turn, and successive turns, of the track 14 on the disk 12. Therefore, in order to make this continuously varying transfer rate constant, the demodulated information is subsequently written on the memory 46 with the concurrent delivery of the continuously spraying frequency clock signal to its write input W from the first clock 30. The demodulated information has a constant transfer rate on being subsequently read out from the memory 46 with the delivery of the constant frequency clock signal to its read input R from the second clock 48.

The VCO 38 of the first clock 30 incorporates the three capacitors 74-78 of different capacitances so that the clock signal produced thereby may have a frequency range covering the complete radius of the disk 12. Inputting the address data included in the output from the memory 46, the microcomputer 50 determines whether the transducer 20 is positioned on a radially inside, intermediate, or outside region of the disk 12 and closes one of the switches 80-84 of the VCO 38 accordingly. The central frequency of oscillations of the VCO 38 can thus be set at any of three different values depending upon the radial position of the transducer 20 on the disk 12.

For random access to any frame of the disk track, the microcomputer 50 will conventionally function to cause the positioning means 22 to position the transducer 20 on the destination address. The microcomputer 50 will also determine the approximate radial position of the transducer 20 on the disk 12 and close the appropriate one of the switches 89-84 of the VCO 38, with the consequent change in the central frequency of oscillations of the VCO to suit the approximate radial position of the transducer on the disk.

Heretofore, for random access to CLV disks, the rotation speed of the motor has had to be varied to suit the radius of each frame to be accessed, with the consequent elongation of access time. Contrastingly, according to the invention, all that is required is to close an appropriate one of the switches 80-84, the rotation speed of the motor being constant throughout the length of the track 14 on the disk 12. The invention has thus succeeded in combining the higher data capacity of CLV with the shorter access time of CAV.

POSSIBLE MODIFICATIONS

Although the present invention has been shown and described in the foregoing in very specific aspects thereof, it is not desired that the invention be limited by the exact details of such disclosure. The following, then, is a brief list of possible modifications, alterations and adaptations of the illustrated embodiment which are all believed to fall within the scope of this invention:

1. The frequency range of the VCO 38 could be extended not by the microcomputer 50 but by a position sensor capable of sensing the radial position of the transducer 20, or of any other part movable with the transducer, in three or more steps, or by a potentiometric position sensor capable of continuously sensing the radial position of the transducer.

2. The VCO 38 could be of the Schmitt trigger construction.

3. The central frequency of the VCO 38 could be altered by switching between different resistance values, or continuously as by a variable capacitance diode or variable resistor.

4. Information could be recorded on the CLV disk in NRZ, modified frequency modulation, or other encoding formats, and clock data could be recorded aside from the primary information.

5. The invention could be applied to the reading of magnetic CLV disks.

6. A different rotation rate of the CLV disk 12 could be used for an inside region and an outside region of the CLV disk 12.

What is claimed is:

1. An apparatus for reading a rotating constant linear velocity (CLV) disk, the CLV disk having primary information prerecorded together with clock data all along a multiturn spiral track thereon, the apparatus comprising:
    (a) drive means for driving the CLV disk at a constant angular velocity (CAV) so as to read at CAV throughout the length of the multiturn spiral track;
    (b) a transducer movable along the track on the rotating CLV disk for reading the prerecorded primary information and clock data;
    (c) a first clock connected to the transducer for producing a first clock signal derived from the clock data read on the CLV disk, the first clock signal varying in frequency in step with a varying rate of the clock data being read on the CLV disk being driven at CAV;
    (d) a second clock for producing a second clock signal having a constant frequency; and
    (e) a memory connected to the transducer and to the first and the second clocks for storing the recovered primary information while being clocked by the first clock signal and for putting out the recovered primary information while being clocked by the second clock signal.

2. The apparatus of claim 1 further comprising a demodulator circuit connected to the transducer and to the first clock for demodulating the recovered primary information while being clocked by the first clock signal.

3. The apparatus of claim 1 wherein the first clock comprises:
   (a) a voltage controlled oscillator for producing the first clock signal; and
   (b) phase comparator means having inputs connected to the voltage controlled oscillator and to the transducer and an output connected to the voltage controlled oscillator for producing a signal representative of a phase difference between the first clock signal and an output from the transducer.

4. The apparatus of claim 3 further comprising:
   (a) control means connected to the transducer for generating transducer position signals indicative of approximate transducer positions in a radial direction of the CLV disk; and
   (b) means included in the voltage controlled oscillator of the first clock and connected to the control means for varying a central frequency of oscillations of the voltage controlled oscillator according to the radial position of the transducer on the CLV disk.

* * * * *